(12) United States Patent
McNew et al.

(10) Patent No.: US 8,094,614 B2
(45) Date of Patent: Jan. 10, 2012

(54) SYSTEM AND METHOD FOR ADAPTIVE QUEUING FOR DISCONTINUOUS WIRELESS CHANNELS

(75) Inventors: Justin Paul McNew, Del Mar, CA (US); John Thomas Moring, Encinitas, CA (US); Khaled I. Dessouky, Studio City, CA (US)

(73) Assignee: Kapsch Tafficcom AG, Vienna (AT)

( * ) Notice: Subject to any disclaimer, the term of this patent is extended or adjusted under 35 U.S.C. 154(b) by 1068 days.

(21) Appl. No.: 11/759,120

(22) Filed: Jun. 6, 2007

(65) Prior Publication Data

US 2008/0232309 A1 Sep. 25, 2008

Related U.S. Application Data

(60) Provisional application No. 60/896,174, filed on Mar. 21, 2007.

(51) Int. Cl.
*H04W 4/00* (2009.01)

(52) U.S. Cl. ...................... 370/329; 370/395.5; 370/342

(58) Field of Classification Search .................. 370/329, 370/395.5, 342
See application file for complete search history.

(56) References Cited

U.S. PATENT DOCUMENTS

| | | | | |
|---|---|---|---|---|
| 6,137,789 | A * | 10/2000 | Honkasalo | 370/342 |
| 6,847,651 | B1 * | 1/2005 | Westerberg | 370/437 |
| 7,403,514 | B1 * | 7/2008 | Moulsley | 370/345 |
| 2004/0100965 | A1 * | 5/2004 | Proctor et al. | 370/394 |
| 2004/0229639 | A1 * | 11/2004 | Meyers et al. | 455/522 |
| 2004/0264475 | A1 * | 12/2004 | Kowalski | 370/395.5 |
| 2008/0232309 | A1 * | 9/2008 | McNew et al. | 370/329 |

\* cited by examiner

*Primary Examiner* — Charles Shedrick
(74) *Attorney, Agent, or Firm* — Christie, Parker & Hale, LLP (57) ABSTRACT

A method and system for data transmission on wireless discontinuous channels. The method and system include adjusting ordering of a plurality of transmission units in a queue to be transmitted in a wireless discontinuous channel to reduce unusable channel access time; determining transmission eligibility of each of the transmission units in the queue; and servicing the queue by transmitting the transmission units responsive to the adjusted order.

22 Claims, 5 Drawing Sheets

SYSTEM AND METHOD FOR ADAPTIVE QUEUING FOR DISCONTINUOUS WIRELESS CHANNELS

CROSS-REFERENCE TO RELATED APPLICATIONS

This patent application claims the benefit of the filing date of U.S. Provisional Patent Application Ser. No. 60/896,174, filed on Mar. 21, 2007 and entitled "SYSTEM AND METHOD FOR ADAPTIVE QUEUING FOR DEDICATED SHORT RANGE COMMUNICATIONS," the entire content of which is hereby expressly incorporated by reference.

FIELD OF THE INVENTION

The present invention relates generally to wireless communications systems, and more specifically to transmission queue management for optimizing wireless communications systems performance.

BACKGROUND OF THE INVENTION

Typical vehicular and roadside units within a wireless dedicated short range communication (DSRC) system exchange both high priority/low latency data (e.g., emergency warnings), and low priority/best effort data (e.g., map updates). An example of such a system is specified in the IEEE 1609 family of standards for wireless access in vehicular environments (WAVE). Such systems employ a series of radio channels in the 5 GHz band, one of which is designated a control channel and others designated service channels. Data packets (transmission units) may be of varying sizes. A contention-based scheme is used for channel access.

Figure 1:
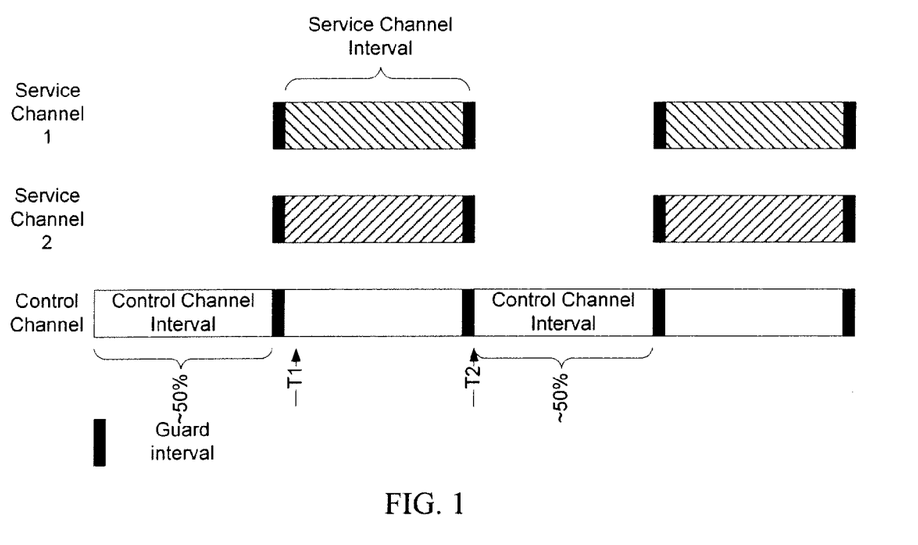
FIG. 1 shows an exemplary system timing, with the control channel, service channel, and guard intervals.

All devices are required to periodically tune to the control channel to exchange information of general interest. At other times, devices may operate on any of the service channels to exchange information of interest to a subset of the devices. These times are known as the control channel interval and service channel interval respectively. Between each control channel interval and service channel interval is a guard interval, reserved for radio frequency tuning, where transmissions are not allowed. The effect of this is that access to any given channel is discontinuous and is available only within a channel interval with a known end time. This is illustrated in FIG. 1.

As shown, when data arrives at a device for transmission on one of the channels, the data is queued. Any of several factors will affect the time the data may actually be transmitted.

The wireless system may impose medium access control protocols, such as those specified in IEEE Std. 802.11p, Information technology—Telecommunications and information exchange between systems—Local and metropolitan area networks—Specific requirements—Part 11: Wireless LAN Medium Access Control (MAC) and Physical Layer (PHY) specifications: Wireless Access in Vehicular Environments (WAVE)—DRAFT STANDARD, the entire content of which is hereby expressly incorporated by reference.

The wireless system may specify prioritization of data, such that higher priority data has precedence and is more likely to be transmitted first.

A device with a single-channel radio can only operate on one channel at a given instant. If it has control channel data arriving for transmission during the service channel interval (e.g., T1 in FIG. 1), the data must be queued until at least the beginning of the next control channel interval. Likewise for service channel data arriving during the control channel interval.

Since data can not be transmitted during the guard interval, no transmission should start at a time that would cause the transmission to overlap the guard interval.

Some systems employ a quality of service-based queue maintenance structure specified in IEEE Std. 802.11e, Information technology—Telecommunications and information exchange between systems—Local and metropolitan area networks—Specific requirements—Part 11: Wireless LAN Medium Access Control (MAC) and Physical Layer (PHY) specifications: Amendment: Medium Access Control (MAC) Quality of Service Enhancements, the entire content of which is hereby expressly incorporated by reference. However, this mechanism does not account for performance improvements that can be made to accommodate the transmission disruptions imposed by the non-continuous channel availability of the system.

SUMMARY

The invention optimizes the utilization of discontinuous wireless communications channels by manipulating the transmit order of data transmission units at participating stations. Transmission units are ordered for transmission based on their characteristics (e.g., age, size, priority) and system policies. As transmission opportunities occur, transmission units are bypassed if they are determined to be ineligible due to a low probability of delivery success in the current transmission interval, for example based on size.

In one embodiment, the present invention is a method and system for data transmission on wireless discontinuous channels. The method and system include: adjusting ordering of a plurality of transmission units in a queue to be transmitted in a wireless discontinuous channel to reduce unusable channel access time; determining transmission eligibility of each of the transmission units in the queue; and servicing the queue by transmitting the transmission units responsive to the adjusted order.

In one embodiment, the present invention is a system for data transmission on wireless discontinuous channels. The system includes a plurality of devices communication via one or more wireless discontinuous channels. Each of the plurality of devices include: a radio transceiver; a processor coupled to the radio transceiver; a memory for storing instructions to be executed by the processor; and an interface for accepting user data for transmission and accepting configuration parameters used by the processor in executing its instructions. The instructions when executed by the processor perform the steps of: adjusting ordering of a plurality of transmission units in a queue to be transmitted in a wireless discontinuous channel to reduce unusable channel access time; determining transmission eligibility of each of the transmission units in the queue; and servicing the queue by transmitting the transmission units responsive to the adjusted order.

The wireless discontinuous channel is discontinuous due to the transmitting unit switching to a different radio channel, or due to predetermined system access constraints.

DETAILED DESCRIPTION

In one embodiment, the present invention more efficiently uses the available channel resources, that is, it provides a higher effective channel throughput without sacrificing transmission priority precedence. The invention dynamically adjusts the ordering of data units (transmission units) for transmission at one or more of the individual devices to reduce the amount of unusable channel access time near the guard interval. The invention does not commence transmission of a data unit at a time that would make the successful delivery of the transmission unit unlikely or impossible.

In one embodiment, the present invention describes a method for manipulating the order of protocol data units queued for transmission on a wireless medium, and deferring the transmission time of those that can not be delivered in the current channel interval. Higher utilization of the medium is achieved, and precedence of higher-priority data is maintained.

In one embodiment, the invention applies to wireless systems with the following characteristics.

A shared communications channel with a contention-based or similar access mechanism.

Non-continuous communications channel availability, e.g., a system where the participating devices switch between a control channel and a service channel for the exchange of different classes of traffic.

Examples of such systems include vehicular systems such as those operating within the constraints of Dedicated Short Range Communications (DSRC) and Wireless Access in Vehicular Environments (WAVE).

In one embodiment, the invention is most effective for systems with non-uniform data packet or transmission unit sizes. Additionally, the invention supports systems carrying traffic with different levels of priority, but this is not necessary for the operation of the invention. In one embodiment, the invention is a distributed system, operating at each transmitting device. Benefits will be achieved even if not all communicating devices implement the invention.

Figure 2A:
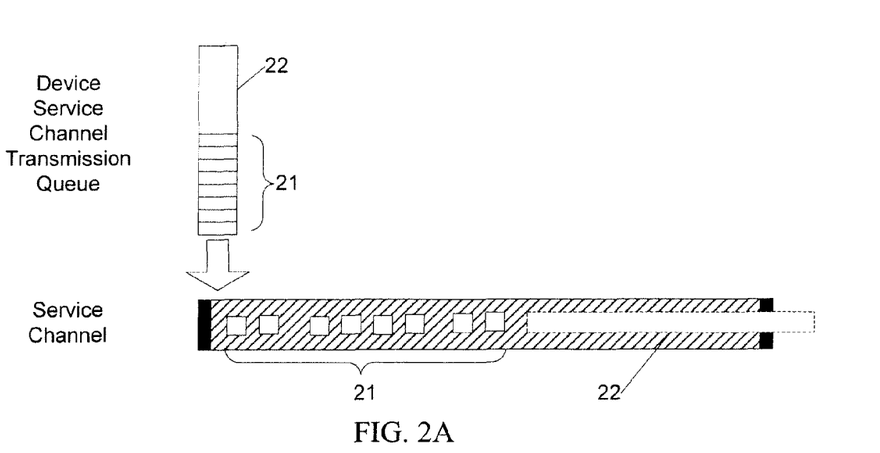
FIGS. 2A and 2B show an example of how queue ordering can increase system capacity, according to an embodiment of the present invention.
Figure 2B:
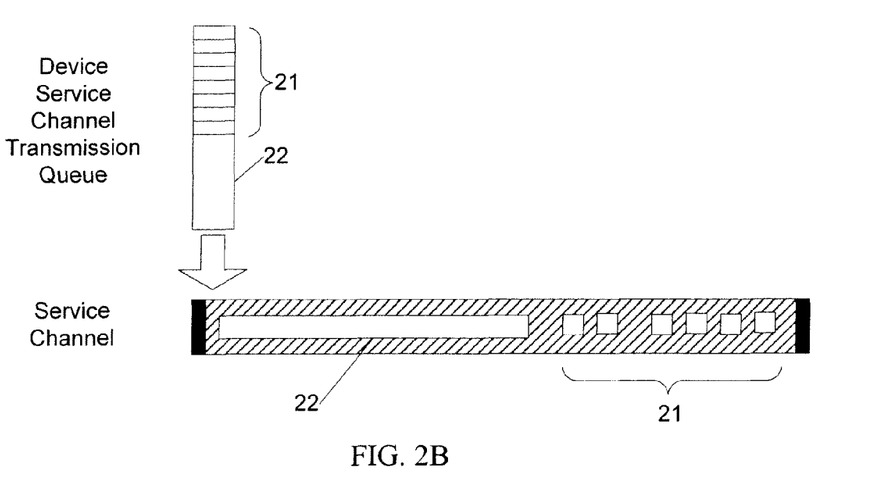

FIGS. 2A and 2B show an example of how queue ordering can increase system performance. In the first example, FIG. 2A, the queue is served first in, first out, which in this example places small transmission units (TU) 21 first. The small TUs are transmitted, leaving not enough time in the channel interval to deliver the large TU 22. The delivery latency of that data is increased since it can not be delivered until some subsequent channel interval. At best, if the transmission unit is not initiated in the current interval, this leaves a large portion of the interval unusable by the transmitting device, At worst, if the transmission unit is initiated in the current interval, it still fails to be delivered because it overlaps the guard interval, and a large portion of the channel interval remains unusable by any device on the network.

In the second example, FIG. 2B, the large TU 22 is sent first, which allows the remaining portion of the interval to be utilized in the transmission of small TUs 21, and leaving negligible wasted capacity. Smaller TUs not delivered in the current interval are deferred for delivery in the next interval (not shown). In this case, the invention optimizes the utilization of the available channel interval.

Figure 3:
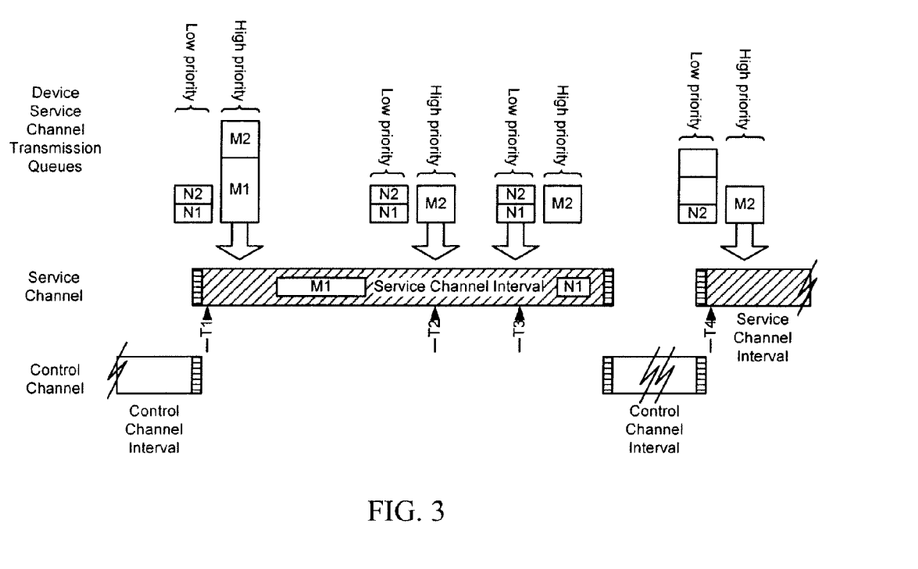
FIG. 3 illustrates an example of the adjustment of queues for a service channel, according to an embodiment of the present invention.

In one embodiment, the invention allows otherwise-unused channel capacity to be used to deliver lower-priority traffic when higher priority traffic can not be sent due to channel timing constraints. Specifically, if the first transmission unit in the queue has a low probability of success due to an impending radio channel transition, a transmission unit with higher likelihood of success (e.g., due to a smaller size or other factors) may be moved forward for transmission. An example of this is shown in FIG. 3. FIG. 3 illustrates an example of the adjustment of queues for a service channel, according to an embodiment of the present invention. At time T1, the start of the service channel interval, the queue includes a large transmission unit M1, a medium sized transmission unit M2, and two smaller, lower-priority transmission units N1 and N2. M1 is transmitted using the medium access control protocols in effect. Subsequently, at T2, the queue contains M2 followed by the lower priority transmission units. There may be an attempt to send M2, but it may not succeed, for example, due to channel congestion. Leading up to time T2, the queue transmission order still includes M2 followed by the lower priority transmission units. However, at this time there is no chance to deliver M2 before the guard interval. The adaptive queuing process of the invention marks ineligible and defers the larger transmission unit M2 at T3 to attempt the smaller, lower-priority transmission units, starting with N1. In this example, the first low priority units (N1) is successfully delivered in the current service channel interval, but not the second (N2). As shown, at the start of the next service channel interval T4, the queue is reset to give the higher priority transmission unit M2 the first chance at delivery. The untransmitted low priority unit N2 is also carried over to the next interval, along with any transmission units that arrive in the mean time. In this case, the invention improves channel utilization by allowing the delivery of the lower priority transmission unit N1 in otherwise unused portion of the channel interval.

Figure 4:
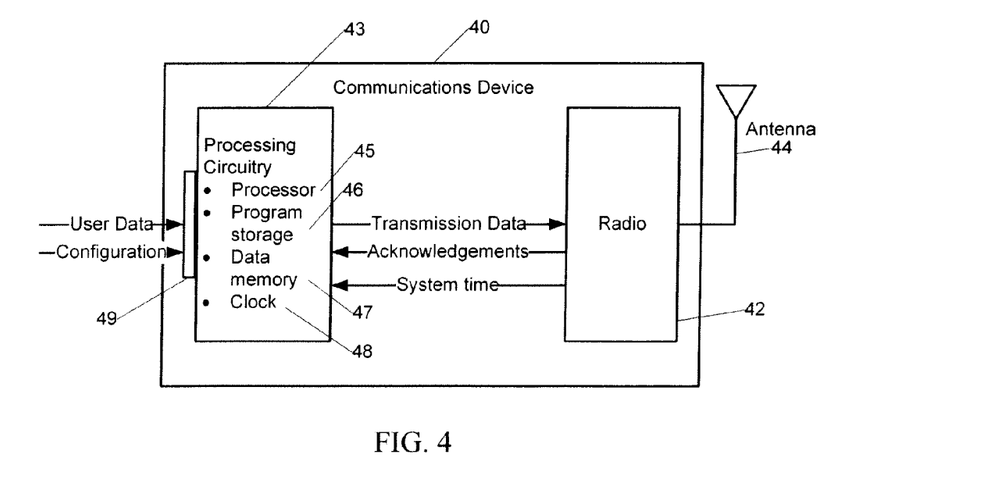
FIG. 4 depicts an exemplary communication device, according to an embodiment of the present invention.

FIG. 4 depicts an exemplary communication device, according to an embodiment of the present invention. As shown, the communications device 40 includes a radio transceiver 42, with an antenna 44 which may be internal or external to the device. The radio transceiver 42 is electrically connected to a processing unit (circuitry) 43, which includes at least the following components or their equivalents. A processor 45, such as any of a variety of commercially available embedded microprocessor devices; a program storage 46 including memory for holding the operating instructions used by the processor 45; data memory 47 for holding data queued for transmission; and a clock 48, or other timing source, for keeping track of internal time relative to the system time that determines the channel transitions. In one embodiment, device timing is maintained via an external interface. The communication device 40 also includes an interface 49 for accepting user data for transmission and configuration parameters used by the processor in executing its operating instructions. In some embodiments, the user data could be generated within the communications device itself, or the configuration parameters could be loaded into the device at the time of manufacture.

A typical device is likely to include additional components, and may perform additional functions (e.g., receive data) via the components that support the invention.

In one embodiment, the invention achieves adaptive queuing via three main processes: queue ordering, transmission eligibility determination, and queue servicing. Each of these processes is described below.

In one embodiment, the queue order is based on priority, time in queue, and/or TU size. Although in the illustrated examples, separate priority queues are illustrated for simplicity purposes, some embodiments can equivalently employ a single queue.

Figure 5:
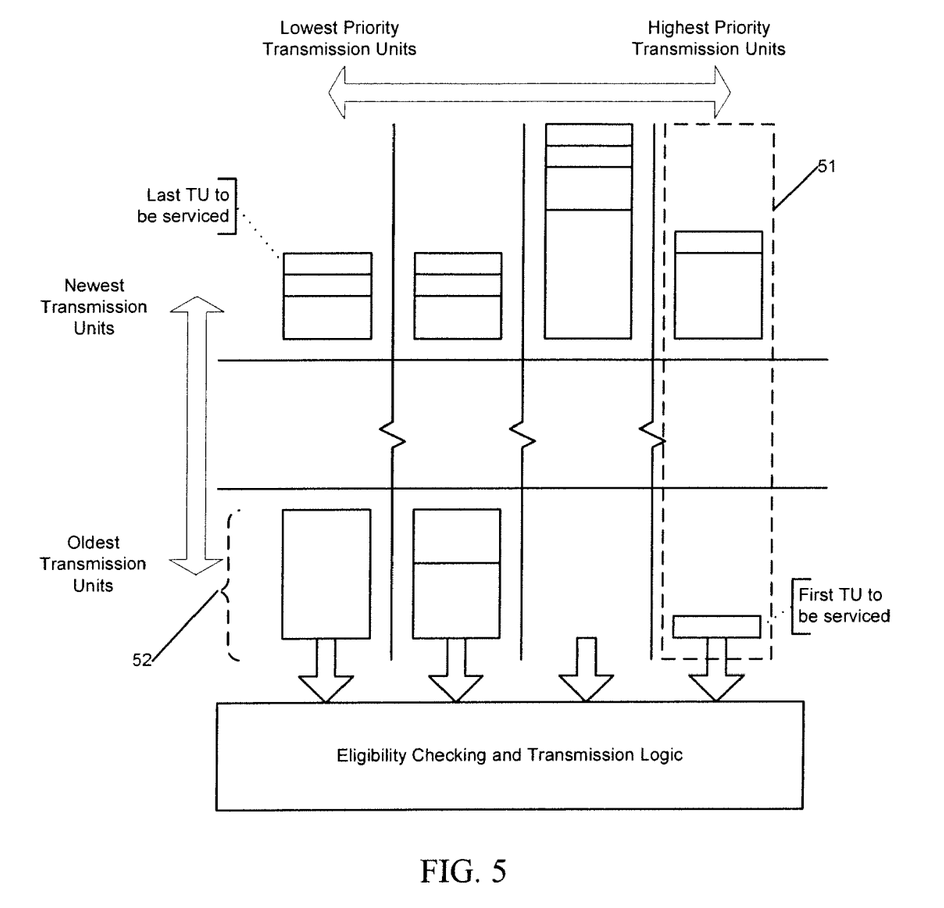
FIG. 5 illustrates how transmission units are ordered in priority queues, according to an embodiment of the present invention.

FIG. 5 illustrates an exemplary queue ordering process. TUs are first ordered by priority, in this case, the right-most queue 51 would be serviced first. Within each priority, oldest TUs 52 are given precedence. The age of the TU is the duration that it has been held in the queue awaiting transmission. A convenient unit for measuring age is channel intervals, though some other unit could be used. In a lightly loaded system, all TUs may be of the same age, since TUs quickly leave the queue.

Within groups of TUs of the same age, largest TUs are ordered first. This on average imposes a more efficient use of channel time than a random ordering, described later.

In one embodiment, transmission eligibility determination is based on a probability of successful delivery. Some inputs to the eligibility process may include one or more of: total TU size, including overhead; available time, from scheduled TU transmission time to the end of the channel interval; channel delay statistics; channel data rate(s); TU error rate for each data rate; and delivery error threshold.

For a single channel data rate (not considering channel delay statistics), the transmission duration equals the TU size divided by the channel data rate. If this time exceeds the available time, the TU is ineligible.

If channel access delay statistics are available, they may be used to refine the eligibility calculation. In a contention-based medium, a TU transmission will be delayed from its scheduled transmission time if a TU from another device is occupying the channel at the TU's scheduled transmission time. The transmit delays can be measured over time. Some embodiments of the invention add the median or average transmit delay for recent (e.g., calculated over the last n intervals) TUs, to the duration value as calculated above. Alternately, typical delay could be calculated using the mean channel access delay, and/or some other relevant statistical prediction.

If multiple available channel data rates are available, a rate adjustment process may be used. In one embodiment, the transmission duration is calculated using the channel data rate with the highest TU error rate that is less than the delivery error threshold. If this time exceeds the available time, the TU is ineligible. TU error rate can be estimated based on channel monitoring, or can be configured. Delivery error threshold may be pre-configured or may be based on other considerations. If no error threshold is available, a 100% error rate threshold is used, allowing all channel data rates.

If a transmission unit misses its scheduled transmit opportunity, for example due to channel congestion, eligibility is recalculated for the retransmission attempt.

An exemplary rate adjustment process is illustrated in the following example. In Table 1, parameters including a representative TU size, available time, channel data rates with associated TU error rates, an error threshold above which a data rate will not be used, are shown, from which an expected channel access delay is chosen.

In this example, 11 Mbps is the highest data rate available for the transmission, since the error rate for 22 Mbps exceeds the threshold. In Table 2, the channel duration for the TU at 11 Mbps is calculated, and it is determined that it consumes less than the available time and is therefore eligible. If the error threshold was changed to 5%, 11 Mbps would not be allowed, and the 6 Mbps rate would be used since it meets the error and time criteria. If the error threshold was set to 2%, only the 2 Mbps rate would be allowed, and the calculated duration would exceed the available time, so the TU would be ineligible.

TABLE 1

Example transmission parameters

| TU Size | Available Time | Data Rates | Error Rate | Error Threshold | Median Delay |
|---|---|---|---|---|---|
| 1000 bytes | 1.5 ms | 6 Mbps | 1% | 15% | 0.1 ms |
|  |  | 11 Mbps | 10% |  |  |
|  |  | 22 Mbps | 25% |  |  |

TABLE 2

Example transmission calculations

| Data Rate | Error Rate | Duration = (TU size)/(data rate) + delay |
|---|---|---|
| 2 Mbps | 1% | 4.1 ms |
| 6 Mbps | 5% | 1.43 ms |
| 11 Mbps | 10% | 0.83 ms |
| 22 Mbps | 25% | NA (rate exceeds threshold) |

In one embodiment, each queue is visited in priority order. Within each queue, TUs are serviced in the order determined by the ordering process specified above. If a TU is not marked eligible, as specified above, it is passed over to be revisited in the next channel interval. A transmission unit arriving while the queue is being serviced is serviced based on its priority and size. For example, it may be serviced immediately if it is the highest-priority TU available. Variations of the process may be made to accommodate specific details of different channel access mechanisms.

Figure 6:
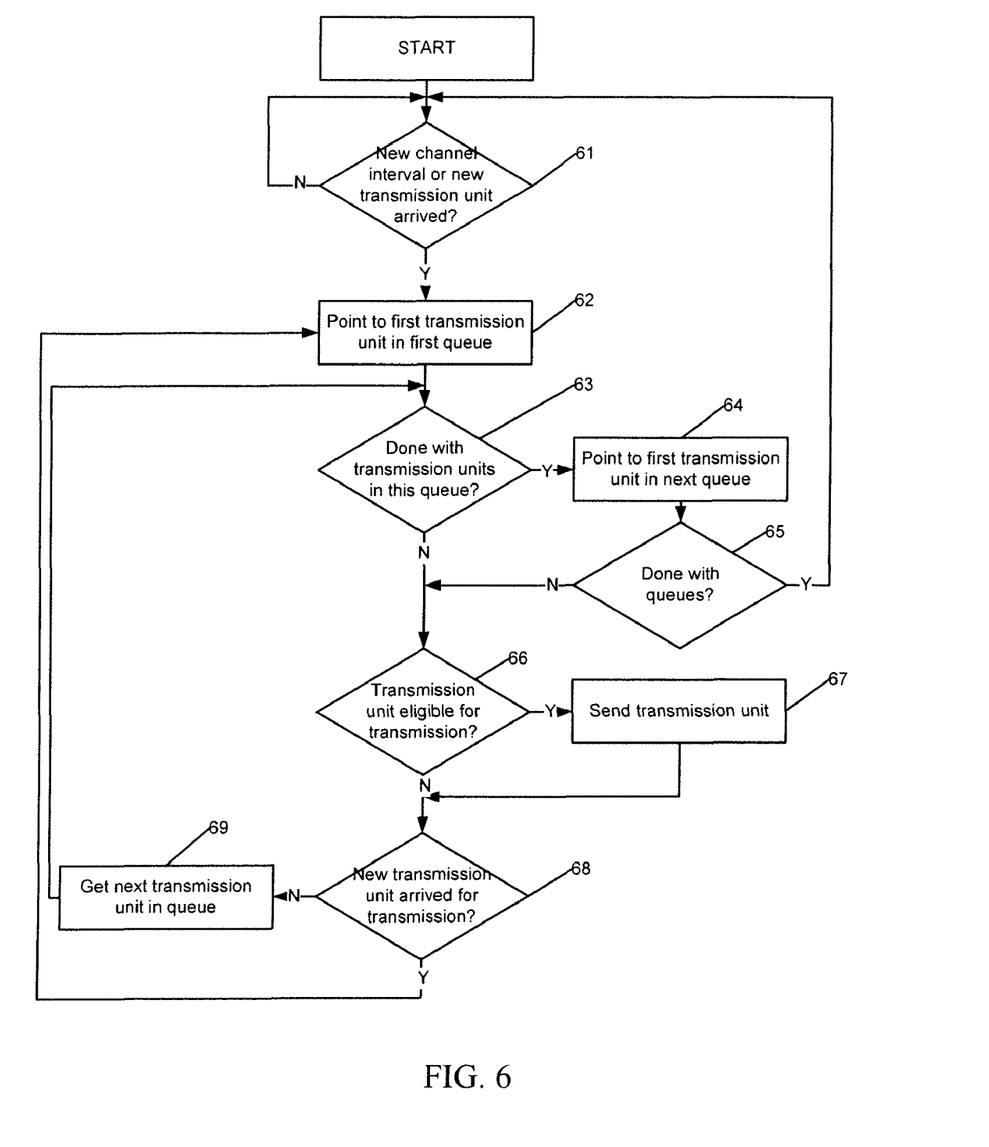
FIG. 6 illustrates an exemplary process flow performed at a transmitting device, according to an embodiment of the present invention.

FIG. 6 illustrates an exemplary process for queue servicing. The process waits (block 61) until the start of the next channel interval, or until the queue contents are updated by the arrival of a new transmission unit into the queue. When one of these events occurs, the head of the first queue is examined, as shown in block 62. In block 63, if the queue is empty, the head of the next queue is examined in block 64. If the last queue is found to be empty (block 65), the algorithm resumes from block 61. If there is a transmission unit found in the queue in blocks 63 or 65, the then determines whether the transmission unit is eligible for transmission, as shown in block 66. If the transmission unit is eligible, it is transmitted in block 67, using an appropriate medium access mechanism for the communication link in use. After the transmission unit is sent, or if the transmission unit in block 66 was found to be ineligible, the process determines whether a new transmission unit has arrived at the queue while it was processing the previous transmission unit, as depicted in block 68. If a new transmission unit has arrived, the process resumes from block 62. Otherwise, the next transmission unit in the queue is selected in block 69, and the process resumes from block 63. Although not explicitly shown in FIG. 6, if the end of the channel interval is recognized at any point in the processing, the process returns jump to block 61.

Some embodiments of the invention have one or more of the following characteristics.

1. Transmission queues within one or more wireless devices in a wireless system that has a "control" channel and one or more "service" channels. Operation on each of these channels is governed by predetermined time intervals. Switching between the channels occurs prior to the start of the corresponding time interval. Transmission within each interval is subject to a medium access control protocol.
2. An adaptive queue management method for improving wireless system performance, by ordering transmission units at the transmitting device, and deferring transmission of those unlikely to be delivered.
3. Transmission units in a queue are ordered, by priority, by age, and by size.
4. As a transmission queue is serviced, each transmission unit is examined for eligibility, i.e., whether it is expected to be successfully delivered at its scheduled transmission time. If it is unlikely to be delivered, due to lack of time in the channel interval, it is ineligible for transmission and deferred to the next channel interval.
5. Eligibility is calculated based on transmission unit size, channel data rate, and time available until the end of the channel interval.

Simplified embodiments of the invention exhibit some but not all of the features of the above-described embodiments. Specifically, in some simplified embodiments, it is not necessary to optimize queue ordering to achieve performance improvement. Simply checking transmission eligibility, and deferring ineligible transmission units, prevent undeliverable transmission units from blocking the channel during their unsuccessful transmission attempt, as illustrated in the example in FIG. 2A.

Some simplified embodiments of the invention have one or more of the following characteristics.
1. An adaptive queue management method for improving wireless system performance, by deferring transmission of those unlikely to be delivered.
2. As a transmission queue is serviced, each transmission unit is examined for eligibility, i.e., whether it is expected to be successfully delivered at its scheduled transmission time. If it is unlikely to be delivered, due to lack of time in the channel interval, it is deferred to the next channel interval.
3. Eligibility is calculated based on transmission unit size, channel data rate, and time available until the end of the channel interval.

Variants of some embodiments incorporate one or more of the following schemes. Eligibility also considers the typical delay experienced by transmission units due to channel congestion or other factors. Typical delay is the median delay experienced by transmitted packets over some number of recent channel intervals. Other channel delay statistics are also possible.

Moreover, transmission units of different priorities can be queued in one or multiple queues. If the system does not implement a prioritization scheme, it simplifies its operation to a single-queue system. Likewise, transmission units of different ages could be queued in one or multiple physical or virtual queues.

Transmission units are removed from the queue after some time interval, due to staleness. The time interval may be a system constant, or may be based on a value that accompanies the transmission unit. Eligibility is calculated for retransmissions as well as original transmissions.

If multiple channel data rates are supported, the invention can adjust the data rate used for packets to allow them to be transmitted at a higher data rate when they would be ineligible to be transmitted at the default data rate. This is especially useful if the error characteristics (e.g., packet error rate) can be determined or estimated for each data rate. Then an error probability threshold can be applied to the data rate selection process.

The present invention is also applicable to systems that do not necessarily implement control and service channels, but some other form of discontinuous channel access. Examples are systems that use various forms of slotted channel access on a single channel, devices that periodically shut down their transmitters for power savings, and devices that periodically pass in and out of service coverage. The reason for the channel discontinuity is not important to the function of the invention.

The present invention is also applicable to systems where devices do not have clear knowledge of the end time of the channel interval, but will be able to estimate the end of the channel access period. An example would be a vehicle that is aware of the coverage area of a roadside unit and its own location and velocity vector. It can estimate the available time based on the expected loss of coverage, and use that value in its eligibility calculation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for data transmission on wireless discontinuous channels, the method comprising:
adjusting ordering of a plurality of transmission units in a queue of a wireless discontinuous channel having channel timing constraints and shared by a plurality of discontinuous channel transmitters, to be transmitted in said wireless discontinuous channel to reduce unusable channel access time for said wireless discontinuous channel;
determining transmission eligibility of each of the transmission units in the queue of the wireless discontinuous channel for transmission in the wireless discontinuous channel; and
servicing the queue by transmitting the transmission units in the wireless discontinuous channel, responsive to the adjusted order.

2. The method of claim 1, wherein the wireless discontinuous channel is discontinuous due to the transmitting unit switching to a different radio channel.

3. The method of claim 1, wherein the wireless discontinuous channel is discontinuous due to predetermined system access constraints.

4. The method of claim 1, wherein adjusting ordering of a plurality of transmission units in the queue comprises of adjusting ordering of a plurality of transmission units in the queue according to one or more of respective priorities of the transmission units, respective time in the queue of the transmission units, and respective size of the transmission units.

5. The method of claim 1, wherein determining transmission eligibility of each of the transmission units comprises determining transmission eligibility of a given transmission unit according to a likelihood of delivery success of the given data unit in the wireless discontinuous channel.

6. The method of claim 5, wherein the likelihood of delivery success of the given transmission unit is according to one or more of total size of the given data unit, available channel time for the given data unit, channel delay statistics, channel data rate, and error rate for the channel data rate.

7. The method of claim 1, wherein the channel includes multiple data rates, the method further comprising:
   determining a transmission unit error rate for a given channel data rate;
   determining a delivery error threshold;
   determining a channel data rate with the highest transmission unit error rate that is less than the delivery error threshold, from the multiple channel data rates;
   calculating transmission duration for the given transmission unit using the determined channel data rate;
   comparing the calculated transmission duration with an available delivery time; and
   transmitting the given transmission unit when the calculated transmission duration is less than the available delivery time.

8. The method of claim 6, wherein the wireless discontinuous channel is discontinuous due to the transmitting unit switching to a different radio channel.

9. The method of claim 6, wherein the wireless discontinuous channel is discontinuous due to predetermined system access constraints.

10. A method for data transmission on wireless discontinuous channels, the method comprising:
    queuing a plurality of transmission units for transmission via a wireless discontinuous channel having channel timing constraints and shared by a plurality of discontinuous channel transmitters, in a queue;
    dynamically adjusting the ordering of the transmission units in the queue to be transmitted in the wireless discontinuous channel to reduce unusable channel access time;
    determining a likelihood of a successful delivery of a first queued data unit in the wireless discontinuous channel; and
    preventing the transmission of the first queued transmission unit in the queue through the wireless discontinuous channel, when the determined likelihood of success is less than a threshold value.

11. The method of claim 10, where the channel discontinuity is due to the transmitting unit switching to a different radio channel.

12. The method of claim 10, where the channel discontinuity is due to access constraints imposed by the wireless system.

13. The method of claim 10 further comprising transmitting a second queued transmission unit according to a priority criterion.

14. The method of claim 10 wherein the transmission channel is a Dedicated Short Range Communication channel.

15. The method of claim 10, wherein the transmission channel is a Wireless Access in Vehicular Environments channel.

16. The method of claim 10, wherein the likelihood of a successful delivery of a first queued data unit is determined according to one or more of total size of the given data unit, available channel time, channel delay statistics, channel data rate, and error rate for the channel data rate.

17. A system for data transmission on wireless discontinuous channels comprising:
    a plurality of devices communication via one or more wireless discontinuous channels, wherein each of the plurality of devices comprises:
      a radio transceiver;
      a processor coupled to the radio transceiver;
      a memory for storing instructions to be executed by the processor; and
      an interface for accepting user data for transmission and accepting configuration parameters used by the processor in executing its instructions, wherein the instructions when executed by the processor perform the steps of:
    adjusting ordering of a plurality of transmission units in a queue of a wireless discontinuous channel having channel timing constraints to be transmitted in said wireless discontinuous channel to reduce unusable channel access time;
    determining transmission eligibility of each of the transmission units in the queue of the wireless discontinuous channel for transmission in the wireless discontinuous channel; and
    servicing the queue by transmitting the transmission units in the wireless discontinuous channel, responsive to the adjusted order.

18. The system of claim 17, wherein the wireless discontinuous channel is discontinuous due to the transmitting unit switching to a different radio channel.

19. The system of claim 17, wherein the wireless discontinuous channel is discontinuous due to predetermined system access constraints.

20. The system of claim 17, wherein adjusting ordering of a plurality of transmission units in the queue comprises of adjusting ordering of a plurality of transmission units in the queue according to one or more of respective priorities of the transmission units, respective time in the queue of the transmission units, and respective size of the transmission units.

21. The system of claim 17, wherein determining transmission eligibility of each of the transmission units comprises determining transmission eligibility of a given transmission unit according to a likelihood of delivery success of the given data unit.

22. The system of claim 21, wherein the likelihood of delivery success of the given transmission unit is according to one or more of total size of the given data unit, available channel time for the given data unit, channel delay statistics, channel data rate, and error rate for the channel data rate.

* * * * *

UNITED STATES PATENT AND TRADEMARK OFFICE
CERTIFICATE OF CORRECTION

| | | |
|---|---|---|
| PATENT NO. | : 8,094,614 B2 | Page 1 of 1 |
| APPLICATION NO. | : 11/759120 | |
| DATED | : January 10, 2012 | |
| INVENTOR(S) | : Justin Paul McNew et al. | |

It is certified that error appears in the above-identified patent and that said Letters Patent is hereby corrected as shown below:

Column 8, Claim 4, line 55    After "comprises"
    Delete "of"

Column 10, Claim 17, line 8    Delete "devices"
    Insert --devices for--

Column 10, Claim 20, line 39    After "comprises"
    Delete "of"

Signed and Sealed this
Seventh Day of August, 2012

David J. Kappos
*Director of the United States Patent and Trademark Office*